United States Patent Office 2,902,519
Patented Sept. 1, 1959

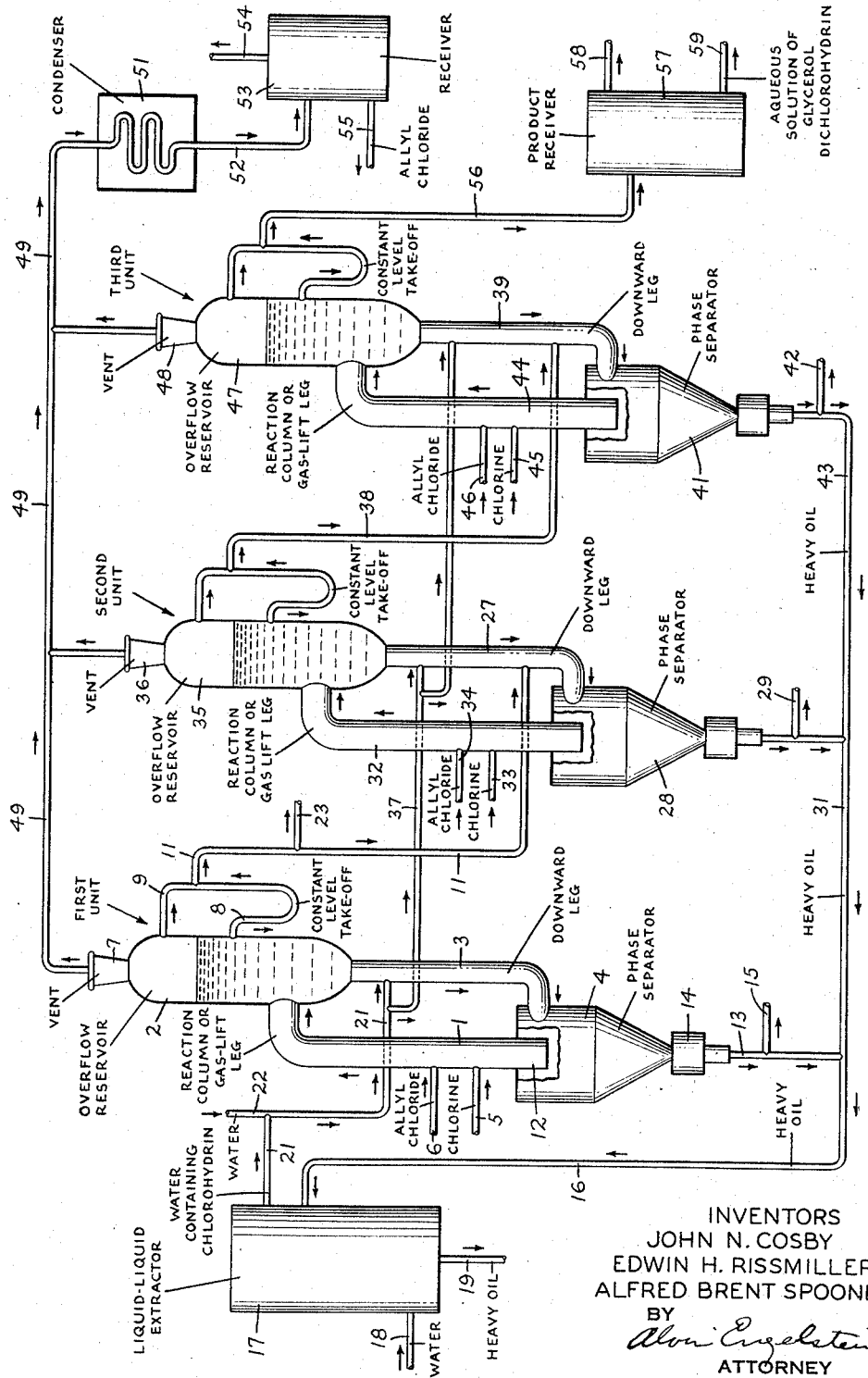

2,902,519

MANUFACTURE OF CHLOROHYDRINS

John N. Cosby and Edwin H. Rissmiller, Morris Township, Morris County, and Alfred Brent Spooner, Orange, N.J., assignors to Allied Chemical Corporation, a corporation of New York Application January 9, 1957, Serial No. 633,325

3 Claims. (Cl. 260—633)

This invention relates to halohydrination of unsaturated organic compounds and more particularly refers to a new and improved process for the production of chlorohydrins by the reaction of hypochlorous acid with olefin compounds having two and three carbon atoms. The unsaturated compounds which are advantageously treated according to the present invention include ethylene, propylene, allyl alcohol and allyl chloride.

Conversion of allyl chloride to glycerol dichlorohydrin by introducing chlorine gas and allyl chloride to a body of water is known, as illustrated by the following equation:

$$CH_2=CH-CH_2Cl + Cl_2 + H_2O \longrightarrow$$
$$\begin{Bmatrix} CH_2Cl-CHOH-CH_2Cl \\ CH_2OH-CHCl-CH_2Cl \end{Bmatrix} + HCl$$

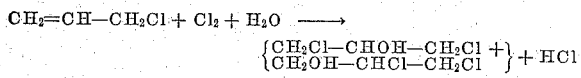

Allyl chloride + chlorine + water ⟶ {glycerol dichlorohydrin isomers} + hydrogen chloride Glycerol dichlorohydrin may be converted to glycerine or to epichlorohydrin, which is a basic material in the production of epoxy resins, plastics and adhesives.

Similarly propylene gas may be reacted with chlorine gas in water to yield propylene chlorohydrins as follows:

$$CH_2=CH-CH_3 + Cl_2 + H_2O \longrightarrow CH_2Cl-CHOH-CH_3 + HCl$$

Propylene + chlorine + water ⟶

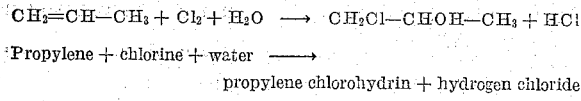

propylene chlorohydrin + hydrogen chloride

An established practice for producing chlorohydrins is to feed the olefin, for example allyl chloride, together with chlorine and make-up water into a circulating aqueous stream and to withdraw simultaneously part of the stream containing product dichlorohydrin. The problem of obtaining high yields of a chlorohydrin by the addition of aqueous HOCl is complicated by several competing side-reactions producing higher chlorinated by-products, for example trichloropropane and chlorinated ethers, which form a water insoluble oil phase. In addition, by-product formation increases when an organic phase is present in the reaction zone; since the by-products are relatively insoluble in water, the oil phase provides a better medium for the formation of the by-products and their formation is autoaccelerated.

By-product formation with reduction in yield during the operation for the production of chlorohydrins from an olefin, chlorine and water in aqueous solution has plagued the industry for many years. In the past, the formation of by-products has been reduced to some extent by providing settling tanks in which oil phase is separated from the circulating aqueous phase as described, for example, in column 2, lines 12–19 of U.S. Patent 2,714,123. While this procedure aided somewhat in the removal of the oil phase, it was unattractive, because, among other things, settling tanks necessarily add appreciably to the equipment and residence time. Other schemes have been proposed with indifferent results, of which recent U.S. Patent 2,714,121 issued July 26, 1955, suggests dispersing the organic by-product throughout the aqueous medium in the form of particles of less than 100 microns in diameter. While this procedure appears to have some benefit with respect to reducing the amount of by-product, it has several disadvantages which include special equipment and conditions for maintaining the oil phase in finely dispersed form, and further, because of the fine dispersion, makes more difficult the task of separating the by-product from the desired chlorohydrin product. A further complication in the prior art processes is the loss of useful chlorohydrin product which is dissolved in the by-product oil phase.

One object of the present invention is to provide a process for the production of increased yields of chlorohydrins from an olefin, chlorine and water in aqueous solution due to the absence of organic by-product phase in the reaction zone.

Another object of the present invention is to provide a process for the production of chlorohydrins from an olefin, chlorine and water in aqueous solution in which rapid and complete separation of by-product organic phase from recycled aqueous phase is accomplished prior to reaction zone.

A further object is to provide a method for accumulation of by-product oil in one collection zone convenient for withdrawal in a process for the production of chlorohydrins from olefin, chlorine and water in aqueous solution.

A still further object of the present invention is to provide a process for the production of chlorohydrins from an olefin, chlorine and water in aqueous solution in which heavy by-product oil is rapidly and continuously separated from the lighter reaction medium without the need for a device having moving parts.

Another object of the invention is to provide a process for the production of chlorohydrins from an olefin, chlorine and water in aqueous solution with substantially complete recovery of chlorohydrin dissolved in by-product oil phase. Other objects and advantages will be apparent from the following description and accompanying drawing.

In one embodiment of the present invention, water is continuously circulated upwardly through a vertical reaction column, maintained at a temperature between 15–85° C., preferably within the range of 50–70° C., chlorine is continuously introduced into the column thereby forming hypochlorous acid, olefin is continuously introduced into the water in the column at a point above the introduction of the chlorine thereby reacting with the hypochlorous acid to form chlorohydrin and concomitantly a small amount of by-product heavy oil, continuously discharging reaction products from the reaction column into a liquid reservoir at a point preferably above the bottom of the reservoir, releasing non-condensable gas from the reservoir, continuously discharging liquid comprising the aqueous solution of chlorohydrin and oily by-product from the reservoir, preferably from the bottom of the reservoir, down through a return column, continuously directing the mixture of aqueous solution of chlorohydrin and by-product oil in the form of a stream tangentially into a swirling mass of liquid in a vessel at a high velocity to convert the linear momentum of the incoming stream to angular momentum of the swirling body of liquid to effect centrifugal separation of the mixture of aqueous solution of chlorohydrin and by-product oil solely from the linear momentum of the incoming stream into a heavy liquid phase of oily by-product at the outer end of the swirling liquid mass and a light liquid phase of aqueous chlorohydrin solution at the inner end of the swirling liquid mass, withdrawing the separated light liquid phase of chlorohydrin solution from a point on the axis of the swirling liquid mass, withdrawing the separated heavy liquid phase of by-product oil from a point on the periphery of the swirling liquid mass, recirculating the thus separated light liquid phase upwardly through the reaction column, continuously bleeding a portion of the circulating aqueous body containing chlorohydrin, passing feed water in intimate contact with the by-product liquid oil to extract chlorohydrin dissolved in the by-product oil, continuously introducing feed water into the circulating aqueous liquid, preferably before phase separation of the aqueous solution of chlorohydrin and by-product oil, regulating the introduction of chlorine and olefin into the circulating aqueous body at a rate to maintain the molar concentration of chlorohydrin in the circulating body between about 0.2 and 0.9, preferably within the range of about 0.4 and 0.6, and regulating the rate of bleed of products and rate of introduction of reactants and water to maintain the circulating body in the system substantially constant.

Referring to the drawing, the cyclic system in which conversion of an olefin to a chlorohydrin by reaction with chlorine in water is carried out may be constructed of a reaction column 1 in which reaction between the olefin and hypochlorous acid occurs, an overflow reservoir 2 into which the reaction products from reaction column 1 discharges, a downward leg 3 extending from the bottom of reservoir 2 through which the reaction products from reservoir 2 fall and discharge into phase separator 4 wherein by-product oil is separated from the entering reaction products and separated aqueous solution of chlorohydrin recirculated up through reaction column 1. Temperature control of the reaction may be maintained by any suitable means, as for example by a heating and cooling jacket around legs 1 and 3. The point of introduction of the chlorine reactant is desirably near the bottom of leg 1 and good dispersion of the gas into the circulating liquid may be had by passing the chlorine gas through line 5 terminating in a sintered glass frit or thimbles, not shown in the drawing, or other nozzle devices. The olefin reactant, which may be ethylene, propylene, allyl alcohol or allyl chloride, as illustrated in the drawing, is introduced through line 6 in gaseous or vapor form and dispersed in the liquid flowing up through reaction column 1 wherein it reacts with the hypochlorous acid produced by the down-stream introduction of chlorine through line 5 into the stream of water flowing up through column 1 to form chlorohydrin. Although the point of introduction of the allyl chloride relative to the point of introduction of the chlorine may be varied somewhat from down-stream to up-stream relative to one another, in the preferred method of operation, the allyl chloride is introduced at a point upstream of the chlorine with sufficient distance between the points of introduction of the two reactants to permit the chlorine time to dissolve and react with the water to form hypochlorous acid. The height of the column above the allyl chloride introduction is, of course, related to the rate of flow to give adequate time to effect substantially complete reaction between the olefin and the hypochlorous acid. Merely by way of illustration, satisfactory operation may be obtained with a column 8 feet in height wherein the chlorine is introduced at a point near the bottom of the column and the allyl chloride is introduced from 1–3 feet above the point of chlorine introduction. The olefin and chlorine reactants entering through lines 5 and 6 are desirably introduced in substantially equimolar proportions. A large excess of the olefin is not detrimental to the operation but does add to the cost necessitated by recovery of the excess olefin. A large excess of chlorine is undesirable since it induces by-product formation. We prefer to cause water to circulate upwardly through column 1 due to the gas lift effect produced by the introduction of the chlorine gas entering through line 5 and the allyl chloride vapor entering through line 6. Forced circulation of the water through column 1 may be induced by mechanical means such as a pump. At the top of column 1 is liquid reservoir 2 which serves the functions of providing a disengaging surface from which excess gas is released and discharged through vent 7 and providing a large body of liquid to assure constancy of supply of liquid for recirculation despite normal minor fluctuations in operation. The effluent from column 1 entering reservoir 2 is composed of an aqueous solution of chlorohydrin and a heavy oily by-product which tends to sink to the bottom of the reservoir. To avoid trapping and collecting of the oily by-product in the reservoir and thereby produce greater formation of by-product with reduced yields of desired chlorohydrin, it was found desirable to place the inlet of recycle leg 3 at the bottom of reservoir 2 to discharge any heavy oily layer from the reservoir and to introduce the reaction product from leg 1 at a point above the bottom to favor gentle agitation of the liquid contents in reservoir 2. A generally cylindrical reservoir was found superior to a pear-shaped or spherical reservoir in that there was less tendency for oil to collect on the surface of the water in the reservoir.

To assist in maintaining a constant volume of circulating liquid in the system, reservoir 2 is fitted with a constant level take-off 8 vented with a top vapor-vent 9 to prevent syphoning. The aqueous solution of the desired chlorohydrin product is bled from the system through line 11. The liquid containing oil from the reservoir falls by gravity down through downward leg 3 and is introduced tangentially through a nozzle to impart high velocity into phase separator 4. Phase separator 4 may be a pear-shaped vessel or a cylindrical vessel with a tapered bottom, as illustrated in the drawing, and provided with a discharge conduit 12 for withdrawing separated light liquid phase, and discharges heavy oil phase which falls down from the periphery of vessel 4 and discharges through line 13. Beneath the apex of the cone may be provided an expansion zone 14 into which the oil droplets may settle and coalesce. The liquid comprising an aqueous solution of chlorohydrin and a few percent of heavy oily by-product in finely divided and dispersed form in the aqueous medium flowing down through leg 3 enters phase separator 4 tangentially at a velocity of 2 to 25 feet/sec., preferably about 5 to 10 feet/sec. to form a swirling mass of liquid in the vessel. As a result of centrifugal force induced solely by the linear momentum of the incoming stream of liquid from downward leg 3, the mixture separates into a light liquid phase of aqueous solution of chlorohydrin which is withdrawn through line 12 up through reaction leg 1, the withdrawal of light phase from phase separator 4 being induced by the gas lift effect due to the introduction of gaseous chlorine and allyl chloride vapor into the column of liquid in leg 1. The heavy liquid moves to the periphery of the vessel falling down by gravity and discharging through line 13. The size of the vessel will, of course, depend on the quantity and nature of mixture required to be separated. Roughly a vessel of 5 feet in diameter and 10 feet in height would be satisfactory for effecting separation of the aqueous mixture at a rate of about 3,000 gallons per minute. In view of the nature of the mixture comprising about 99% aqueous solution with less than 1% oil in finely divided state dispersed therethrough, it is most surprising that a cyclone separator without any moving parts will effectively separate out the less than 1% heavy liquid from the aqueous solution. The oily by-product may be discharged from the system through line 15.

The heavy oil discharging from phase separator 4 was analyzed and found to contain roughly about 10% of the desired dichlorohydrin, about 10% allyl chloride with the remainder composed of trichloropropane, boiling point 78° C./50 mm., and a chloroether fraction, boiling point 97° C./1.5 mm., in the proportion of about 70% to 30% by weight. Thus the oily by-product constitutes an appreciable loss of useful chlorohydrin product and allyl chloride feed material. We found, however, that we could recover over 90% of the useful dichlorohydrin product from the oily by-product layer by passing the oily by-product countercurrent to and in intimate contact with 10 or more volumes of water. Feed or make-up water to the system is required in an amount of in excess of 50 times the amount of the by-product oil formed and all or part of the feed water may be utilized for extracting the valuable dichlorohydrin from the oil. Heavy oil, discharging from the bottom of phase separator 4, may be directed through line 16 into a suitable liquid-liquid extractor 17 of conventional design countercurrent to water entering through line 18. The heavy oil, stripped of the chlorohydrin product, discharges from extractor through line 19. Water containing chlorohydrin flows from liquid-liquid extractor 17 through line 21 into downward leg 3. Water without passing through extractor 17 may be introduced to the system through line 22.

In the start-up of the operation, the unit is filled with water to a level in the reservoir as shown in the drawing. Chlorine and allyl chloride are introduced through lines 5 and 6, respectively, until the concentration of dichlorohydrin in the solution is within the range of 0.3–0.6 mol. Thereafter water is introduced through line 21 to maintain the concentration constant and dichlorohydrin product is discharged from the system through line 23. By-product oil may be removed from the system through line 15 or directed to a liquid-liquid extractor for scrubbing wtih water entering through line 18 to recover the dichlorohydrin dissolved in the heavy oil.

The complete operation for converting olefin with chlorine gas in water to a chlorohydrin may be carried out in one stage in an operation and apparatus as described above. For continuous chlorohydrination at a given product concentration, the yield is greater when the reaction is conducted in a number of stages than when the same similar level is maintained in a single reactor. As a practical matter, three or four stages were found to be an optimum number. In the multistage continuous chlorohydrination operation involving three reactors, the concentrations in the three units may conveniently be maintained at 1/3, 2/3 and 3/3 of final, respectively. The operation of a three-stage continuous unit is illustrated in the drawing, wherein the chlorohydrin product discharging from the first unit through line 11 is continuously fed to the downward leg 27 of a second unit similar in design, construction and operation to the first unit. The reaction products from leg 27 enter phase separator 28, wherein heavy oil is separated and removed via line 29 or directed through line 31 for extraction of valuable chlorohydrin with water entering through line 18. The lighter liquid phase flows upwardly through reaction leg 32 into which chlorine and allyl chloride are introduced through lines 33 and 34 respectively. Reaction products discharge from top of gas lift leg 32 into reservoir 35 and thence down through leg 27. Noncondensable gases are vented through line 36. A portion of the make-up water may be introduced into downward leg 27 through line 37. The concentration of chlorohydrin in the circulating solution in the second unit is, of course, higher than the concentration in the first unit. The more concentrated chlorohydrin solution overflows from reservoir 35 through line 38 into downward leg 39 of unit 3, which again is similar in design and construction to units 1 and 2. Here also the reaction products discharge into phase separator 41 from the bottom of which heavy oil may be removed from the system through line 42 or sent via line 43 for extraction of chlorohydrin product by contact with water entering line 18. The lighter aqueous phase rises upwardly through reaction column 44 into which chlorine and allyl chloride enter through lines 45 and 46 respectively, thereby increasing the concentration of chlorohydrin in the circulating stream. The effluent from leg 44 discharges into reservoir 47 from which uncondensable gases are released through vent 48. The gases and vapors released through vents 7, 36 and 48 flow through line 49 into condenser 51 to effect condensation of allyl chloride and thence discharge through line 52 into receiver 53 wherein liquid allyl chloride is separated from uncondensable gases which are released from the system through line 54. The liquid allyl chloride may be sent through line 55 for further reaction with chlorine in aqueous solution to produce additional dichlorohydrin. The more concentrated product of aqueous chlorohydrin solution overflows from reservoir 47 through line 56 into receiver 57. Uncondensable gases are released from the top of receiver 57 through line 58 and the aqueous solution of glycerol dichlorohydrin discharges as a product through line 59 and, if desired, may be subsequently converted into epichlorohydrin or glycerine.

Although the operation may be carried out at subatmospheric and superatmospheric pressures, it is preferred to employ atmospheric pressure or a slight superatmospheric pressure of the order of less than about 15 p.s.i.g. The operation may be conducted in a single unit or in a plurality of units, preferably three or four units. Merely for purposes of illustration for obtaining an order of magnitude of size of equipment relative to throughput, a single unit for the production of 5,000 tons/year dichlorohydrin plant would employ a reactor leg of about 2 feet in diameter and about 20 feet high with the point of chlorine introduction at a point near the bottom of the reactor leg and the point of olefin introduction about one to two feet above the chlorine inlet. This is equivalent to about 20,000 lb.-mols chlorohydrin per year per square foot of cross-section of reactor leg. The dimensions of the return leg may be about the same as, or slightly smaller than, the reaction column. The size of the reservoir for a unit of this size may be about 5 feet in diameter and 10 feet high, and the size of the cyclone separator for effecting phase separation may be about 5 feet in diameter and 10 feet high. In employing a multistage continuous chlorohydrination, as for example three reactors connected in series, each unit is reduced proportionally but not necessarily equal in size so that the combined capacity of the three units is equal to a single unit. Roughly, the reactor legs in a three-stage series operation would be about 2 feet in diameter for the production of 5,000 tons/year dichlorohydrin plant.

The following example illustrates the present invention:

*Example*

Three recycle reactors connected in series, as illustrated in the drawing, were filled with water to the constant-level in the reservoirs and the chlorine and allyl chloride in substantial equimolar amount were fed to the third reactor at the rate of 0.024 g.-mol/min./cm.$^2$. When the concentration in the third reactor reached 0.20 M of dichlorohydrin, feed of chlorine and allyl chloride was started to the second unit. When the third and second reactors reached 0.40 M and 0.20 M, respectively, the first reactor was brought in the same way to about 0.20 M. Water was then admitted to the first, second and third reactors to maintain the consecutive concentrations in the three reactors at a steady state of 0.19 M, 0.39 M and 0.57 M, respectively. The operation is conducted at substantially atmospheric pressure and the temperature in the reactors maintained at about 65–70° C. By-product oil is separated during each recycling in the phase separator, scrubbed with feed water and the feed water introduced into the system. The aqueous solution of dichlorohydrin was continuously discharged from the reservoir of the third reactor at a rate to maintain the volume of the circulating liquid in the reactors substantially constant. The yield of glycerol dichlorohydrin based on allyl chloride is 93%.

Although certain preferred embodiments of the invention have been disclosed for purpose of illustration, it will be evident that various changes and modifications may be made therein without departing from the scope and spirit of the invention.

We claim:

1. In a continuous cyclic process for the manufacture of chlorohydrins by halohydrination of ethylenically unsaturated organic compounds having at least two and not more than three carbon atoms involving continuously circulating water upwardly through a vertical reaction column, said circulation being due to the gas lift effect produced by the introduction of chlorine gas and ethylenically unsaturated organic compound vapor reactants into the reaction column, continuously introducing chlorine into the circulating water at a point near the bottom of the column to form hypochlorous acid, continuously introducing the ethylenically unsaturated organic compound having at least two and not more than three carbon atoms in vapor form into the water in the reaction column at a point above the introduction of the chlorine to effect reaction of the ethylenically unsaturated organic compound with the hypochlorous acid to form chlorohydrin and concomitantly a small amount of by-product heavy oil, continuously discharging reaction products from the reaction column into a liquid reservoir, releasing non-condensable gas from the reservoir, continuously discharging the aqueous solution of chlorohydrin and oily by-product from the reservoir down through a return column, continuously separating the by-product oil from the aqueous solution of chlorohydrin, continuously recirculating the separated aqueous solution of chlorohydrin, continuously bleeding a portion of the circulating aqueous liquid containing chlorohydrin, continuously introducing feed water into the circulating aqueous liquid, regulating the introduction of chlorine and ethylenically unsaturated organic compound into the circulating aqueous liquid at a rate to maintain the molar concentration of chlorohydrin in the circulating liquid between about 0.2 and 0.9, regulating the rate of bleed of products and the rate of introduction of reactants and water to maintain the circulating liquid in the system substantially constant, the improvement which comprises continuously directing the mixture of aqueous solution of chlorohydrin and by-product oil in the form of a stream tangentially into a swirling mass of liquid at a high velocity sufficient to convert the linear momentum of the incoming stream to angular momentum of the swirling body of liquid to effect centrifugal separation of the mixture of aqueous solution of chlorohydrin and by-product oil solely from the linear momentum of the incoming stream into a heavy liquid phase of oily by-product at the outer edge of the swirling liquid mass and the light liquid phase of aqueous chlorohydrin solution at the inner portion of the swirling liquid mass, withdrawing the separated heavy liquid phase of by-product oil from a point on the periphery of the swirling liquid mass, continuously withdrawing the separated light liquid phase of chlorohydrin solution from the inner portion of the swirling liquid mass, said withdrawal from the vessel of light liquid phase of chlorohydrin solution being induced by the gas lift effect in the reaction column.

2. In a continuous cyclic process for the manufacture of glycerol dichlorohydrin by halohydrination of allyl chloride involving continuously circulating water upwardly through a vertical reaction column maintained at a temperature between about 15–85° C., said circulation being due to the gas lift effect produced by the introduction of chlorine gas and allyl chloride vapor reactants into the reaction column, continuously introducing chlorine into the circulating water at a point near the bottom of the column to form hypochlorous acid, continuously introducing allyl chloride in vapor form into the water in the reaction column at a point above the introduction of the chlorine to effect reaction of the allyl chloride with the hypochlorous acid to form glycerol dichlorohydrin and concomitantly a small amount of by-product heavy oil, continuously discharging reaction products from the reaction column into a liquid reservoir, releasing non-condensable gas from the reservoir, continuously discharging the aqueous solution of glycerol dichlorohydrin and oily by-product from the reservoir down through a return column, continuously separating the by-product oil from the aqueous solution of glycerol dichlorohydrin, continuously recirculating the separated aqueous solution of glycerol dichlorohydrin, continuously bleeding a portion of the circulating aqueous liquid containing glycerol dichlorohydrin, continuously introducing feed water into the circulating aqueous liquid, regulating the introduction of chlorine and allyl chloride into the circulating aqueous liquid at a rate to maintain the molar concentration of glycerol dichlorohydrin in the circulating liquid between about 0.2 and 0.9, regulating the rate of bleed of products and the rate of introduction of reactants and water to maintain the circulating liquid in the system substantially constant, the improvement which comprises continuously directing the mixture of aqueous solution of glycerol dichlorohydrin and by-product oil in the form of a stream tangentially into a swirling mass of liquid at a high velocity sufficient to convert the linear momentum of the incoming stream to angular momentum of the swirling body of liquid to effect centrifugal separation of the mixture of aqueous solution of glycerol dichlorohydrin and by-product oil solely from the linear momentum of the incoming stream into a heavy liquid phase of oily by-product at the outer edge of the swirling liquid mass and the light liquid phase of aqueous glycerol dichlorohydrin solution at the inner portion of the swirling liquid mass, withdrawing the separated heavy liquid phase of by-product oil from a point on the periphery of the swirling liquid mass, continuously withdrawing the separated light liquid phase of glycerol dichlorohydrin solution from the inner portion of the swirling liquid mass, said withdrawal from the vessel of light liquid phase of glycerol dichlorohydrin solution being induced by the gas lift effect in the reaction column.

3. In a continuous process for the manufacture of propylene chlorohydrin by halohydrination of propylene involving continuously circulating water upwardly through a vertical reaction column maintained at a temperature between about 15–85° C., said circulation being due to the gas lift effect produced by the introduction of chlorine gas and propylene vapor reactants into the reaction column, continuously introducing chlorine into the circulating water at a point near the bottom of the column to form hypochlorous acid, continuously introducing propylene in vapor form into the water in the reaction column at a point above the introduction of the chlorine to effect reaction of the propylene with the hypochlorous acid to form propylene chlorohydrin and concomitantly a small amount of by-product heavy oil, continuously discharging reaction products from the reaction column into a liquid reservoir, releasing non-condensable gas from the reservoir, continuously discharging the aqueous solution of propylene chlorohydrin and oily by-product from the reservoir down through a return column, continuously separating oily by-product from the aqueous solution of propylene chlorohydrin, continuously recirculating the separated aqueous solution of propylene chlorohydrin upwardly through the reaction column, continuously bleeding a portion of the circulating aqueous liquid containing propylene chlorohydrin, continuously introducing feed water into the circulating aqueous liquid, regulating the introduction of chlorine and propylene into the circulating aqueous liquid at a rate to maintain the molar concentration of propylene chlorohydrin in the circulating liquid between about 0.2 and 0.9, regulating the rate of bleed of products and the rate of introduction of reactants and water to maintain the circulating liquid in the system substantially constant, the improvement which comprises continuously directing the mixture of aqueous solution of propylene chlorohydrin and by-product oil in the form of a stream tangentially into a swirling mass of liquid at a high velocity sufficient to convert the linear momentum of the incoming stream to angular momentum of the swirling body of liquid to effect centrifugal separation of the mixture of aqueous solution of propylene chlorohydrin and by-product oil solely from the linear momentum of the incoming stream into a heavy liquid phase of oily by-product at the outer edge of the swirling liquid mass and the light liquid phase of aqueous propylene chlorohydrin solution at the inner portion of the swirling liquid mass, withdrawing the separated heavy liquid phase of by-product oil from a point on the periphery of the swirling liquid mass, continuously withdrawing the separated light liquid phase of propylene chlorohydrin solution from the inner portion of the swirling liquid mass, said withdrawal from the vessel of light liquid phase of propylene chlorohydrin solution being induced by the gas lift effect in the reaction column.

References Cited in the file of this patent

UNITED STATES PATENTS

| | | |
|---|---|---|
| 660,214 | Gathman | Oct. 23, 1900 |
| 1,291,857 | Hankar | Jan. 21, 1919 |
| 1,951,647 | Cooke | Mar. 20, 1934 |
| 2,007,168 | Kautter | July 9, 1935 |
| 2,098,608 | Berges | Nov. 9, 1937 |
| 2,130,226 | Britton et al. | Sept. 13, 1938 |
| 2,566,355 | Neuhaus | Sept. 4, 1951 |
| 2,714,122 | Smith et al. | July 26, 1955 |
| 2,714,123 | Johnson | July 26, 1955 |

FOREIGN PATENTS

| | | |
|---|---|---|
| 738,171 | Great Britain | Oct. 12, 1955 |

OTHER REFERENCES

Golding: Tech. of Org. Chem., vol. III, Interscience, N.Y., 1950, pp. 143, 152–7.

Miner et al.: "Glycerol," Reinhold, N.Y., 1953, 83, 352, 354.